United States Patent
Huang (10) Patent No.: US 9,097,913 B2
(45) Date of Patent: Aug. 4, 2015

(54) FOLDABLE EYEGLASSES

(71) Applicant: RUSAN OPTICAL INDUSTRIAL CO., LTD., Taipei (TW)

(72) Inventor: Chin-Shui Huang, Taipei (TW)

(73) Assignee: RUSAN OPTICAL INDUSTRIAL CO., LTD., Taipei (TW)

( * ) Notice: Subject to any disclaimer, the term of this patent is extended or adjusted under 35 U.S.C. 154(b) by 92 days.

(21) Appl. No.: 13/897,158

(22) Filed: May 17, 2013

(65) Prior Publication Data

US 2014/0340628 A1 Nov. 20, 2014

(51) Int. Cl.
*G02C 5/08* (2006.01)
*G02C 5/00* (2006.01)

(52) U.S. Cl.
CPC . *G02C 5/006* (2013.01); *G02C 5/08* (2013.01)

(58) Field of Classification Search
CPC .................................. G02C 5/08; G02C 5/006
USPC ...................................... 351/63, 77, 127, 124
See application file for complete search history.

(56) References Cited

U.S. PATENT DOCUMENTS

| | | | | |
|---|---|---|---|---|
| 188,246 | A * | 3/1877 | Johnson | 351/63 |
| 1,109,930 | A * | 9/1914 | Klein | 351/77 |
| 1,784,013 | A * | 12/1930 | Kern | 351/90 |
| 2,048,600 | A * | 7/1936 | Eglinton | 351/133 |
| 2,274,589 | A * | 2/1942 | Conneely | 351/77 |
| 2,276,222 | A * | 3/1942 | Malcom | 2/445 |
| 2,580,605 | A * | 1/1952 | Schauweker | 2/445 |
| 3,476,466 | A * | 11/1969 | Hopkins | 351/115 |
| 4,029,403 | A * | 6/1977 | Harris | 351/121 |
| 4,681,411 | A * | 7/1987 | Taddei | 351/137 |
| 5,477,281 | A * | 12/1995 | Boyer | 351/128 |
| 6,017,119 | A | 1/2000 | Huang | |
| 6,315,408 | B1 * | 11/2001 | Huang | 351/128 |
| 7,455,402 | B2 | 11/2008 | Gerber et al. | |

(Continued)

FOREIGN PATENT DOCUMENTS

| | | |
|---|---|---|
| CN | 1211742 A | 3/1999 |
| CN | 1462896 A | 12/2003 |

(Continued)

OTHER PUBLICATIONS

Office Action dated Feb. 25, 2015 of the corresponding Taiwan patent application No. 102114316.

(Continued)

*Primary Examiner* — Scott J Sugarman
*Assistant Examiner* — Collin X Beatty
(74) *Attorney, Agent, or Firm* — Chun-Ming Shih; HDLS IPR Services (57) ABSTRACT

A foldable eyeglasses includes a first lens, a second lens and a foldable structure. The second lens is arranged correspondingly to the first lens; the foldable structure is installed between the first and second lenses; the foldable structure includes a first and a second securement stands, a swivel member and a universal joint. The first and second securement stands are attached to the first and second lenses respectively; the swivel member is pivotally attached to the first securement stand; the universal joint is constructed by a turning head portion extended from the swivel member and a receiving slot provided on the second securement stand; the turning head portion is pivotally attached to the receiving slot. Accordingly, the eyeglasses can have a significantly reduced folded size for storage and portability.

20 Claims, 9 Drawing Sheets

(56) References Cited

U.S. PATENT DOCUMENTS

| | | | |
|---|---|---|---|
| 8,833,933 B1 * | 9/2014 | Huang | 351/63 |
| 2008/0094568 A1 * | 4/2008 | Gerber et al. | 351/63 |
| 2010/0302500 A1 | 12/2010 | Cargnel | |
| 2013/0308086 A1 * | 11/2013 | Taylor, Jr. | 351/58 |

FOREIGN PATENT DOCUMENTS

| | | |
|---|---|---|
| CN | 200983038 Y | 11/2007 |
| JP | 08036147 A | 2/1996 |
| JP | 2000180798 A | 6/2000 |
| JP | 2000305050 A | 11/2000 |
| JP | 2002006264 A | 1/2002 |
| JP | 2004258592 A | 9/2004 |
| TW | 374455 | 11/1999 |

OTHER PUBLICATIONS

Office Action dated Apr. 24, 2015 of the corresponding China patent application No. 201310146003.1.

* cited by examiner

FOLDABLE EYEGLASSES

BACKGROUND OF THE INVENTION

1. Field of the Invention

The present invention relates to a pair of eyeglasses, in particular, to a pair of eyeglasses with a foldable structure.

2. Description of Related Art

To achieve the objectives of offering great wearing comforts and facilitated portability of eyeglasses, most eyeglasses adapt the design of utilizing foldable temples for folding and storage purposes, in which the two temples are pivotally attached to the outer side of the two lenses. With such design, the two temples can be folded to the rear of the lenses for storage purposes by using the pivotally attached points as the center of rotations thereof and the effect of having a reduced storage space can be advantageously achieved.

However, despite the fact that the temples of the eyeglasses can be folded for storage, the pair of eyeglasses is still of a significant folded size with the two lenses aligned with each other in a row, which causes the reduced space of a pair of folded eyeglasses to be limited. Accordingly, there is a need for an improvement to effectively reduce the overall size of a pair of folded eyeglasses.

In view of the abovementioned drawbacks associated with the known arts, the inventor seeks to provide a solution for improvement after years of research and development, which is too an objective of the present invention.

SUMMARY OF THE INVENTION

An objective of the present invention is to provide a pair of eyeglasses with a foldable structure capable of using the foldable structure to fold the lenses of the pair of eyeglasses into a stack in order to effectively reduce the overall size of eyeglasses after folding such that the merits of being facilitated for storage with improved portability can be achieved.

To achieve the aforementioned objective, the present invention provides a foldable eyeglasses, comprising:

a first lens;

a second lens arranged correspondingly to the first lens; and a foldable structure installed between the first lens and the second lens, the foldable structure comprising a first securement stand, a second securement stand, a swivel member and a universal joint; wherein the first securement stand is attached to the first lens; the second securement stand is attached to the second lens; the swivel member is pivotally attached to the first securement stand; the universal joint is constructed by a turning head portion extended from the swivel member and a receiving slot provided on the second securement; and wherein the turning head portion is pivotally attached to the receiving slot.

The present invention is also of the following technical effects:

First, by using the universal joint to allow the second lens to rotate vertically and relatively to the first lens, the first lens and the second lens are aligned with each other in a row and in a reverse direction. Further, the second lens is able to rotate horizontally with the swivel member such that it is folds toward the first lens in order to allow the second lens being stacked on top of the first lens. Finally, the temples of the eyeglasses can be further folded. As a result, the overall size of the pair of eyeglasses after folding can be minimized and such that the pair of eyeglasses of the present invention is of the merits of being advantageously facilitated for storage with improved portability.

Second, the first securement stand comprises two protrusions extended therefrom and spaced apart from each other in a top-down manner and a receiving slot formed between the two protrusions. The swivel member is pivotally attached to the two protrusions and received within the receiving slot in order to prevent the swivel member from being obviously exposed to the outer of the eyeglasses and to avoid any obstacles to the appearance of the eyeglasses; therefore, the swivel member is hidden inside the receiving slot such that the overall outer appearance of the eyeglasses can be improved.

DETAILED DESCRIPTION OF THE INVENTION

The following provides detailed description of embodiments of the present invention along with the accompanied drawings. It can, however, be understood that the accompanied drawings are provided for illustrative purposes only and shall not be treated as limitations to the present invention.

Please refer to FIGS. 1 to 7. As shown in the figures, the present invention provides a pair of eyeglasses with a foldable structure, comprising a first lens 1, a second lens 2 and a foldable structure 3.

The second lens 2 is arranged correspondingly to the first lens 1 such that the first lens 1 is aligned with the second lens 2 in a row.

The foldable structure 3 is installed between the first lens 1 and the second lens 2, and the foldable structure 3 comprises a first securement stand 31, a second securement stand 32, a swivel member 33 and a universal joint 34. The first securement stand 31 is attached to the first lens 1; the second securement stand 32 is attached to the second lens 2; the swivel member 33 is pivotally attached to the first securement stand 31; the universal joint 34 is constructed by a turning head portion 341 extended from the swivel member 33 and a receiving slot 342 provided on the second securement 32. The turning head portion 341 is pivotally attached to the receiving slot 342.

Further description of the present invention is provided below. The first securement stand 31 comprises two protrusions 311 extended therefrom and spaced apart from each other in a top-down manner, inner sides of the two protrusions 311 comprise two attachment holes 312 facing opposite to each other, and a receiving slot 313 is formed between the two protrusions 311. In addition, the swivel member 33 comprises a through hole 331 on one end away from the turning head portion 341. Furthermore, the swivel member 33 is a block 332, the turning head portion 341 is a round ball and the receiving slot 342 is a ball shaped slot.

The foldable structure 3 further comprises an insertion pin 35. The insertion pin 35 is inserted and secured into the two attachment holes 312 and the through hole 331 such that the block 332 pivotally attached to the two protrusions 311 is able to swivel and to be received within the receiving slot 313.

The pair of eyeglasses with a foldable structure 10 of the present invention further comprises a lens frame 4. The lens frame 4 further comprises a first lens section 41 and a second lens section 42 spaced apart from each other. The first lens 1 is secured onto the first lens frame section 41, and the second lens 2 is secured onto the second lens frame section 42; accordingly, the pair of eyeglasses 10 in this embodiment is a type of eyeglasses with frames. In addition, the first securement stand 31 is formed on an end portion of the first lens frame section 41 adjacent to the second lens 2, and the second securement stand 32 is formed on an end portion of the second lens frame section 42 adjacent to the first lens 1.

The pair of eyeglasses with a foldable structure 10 of the present invention further comprises a first temple 5 and a second temple 6. The first temple 5 is pivotally attached to one end of the first lens frame section 41 away from the first securement stand 31, and the second temple 6 is pivotally attached to one end of the second lens frame section 42 away from the second securement stand 32.

The pair of eyeglasses with a foldable structure 10 of the present invention further comprises two nose pads 7. One of the nose pads 7 is secured onto the first lens 1 and arranged underneath the firs securement stand 31, and another of the nose pads 7 is secured onto the second lens 2 and arrange underneath the second securement stand 31.

The pair of eyeglasses with a foldable structure 10 of the present invention utilizes the arrangement of the second lens 2 corresponding to the first lens 1, and the foldable structure 3 is installed between the first lens 1 and the second lens 2. The foldable structure 3 further comprises the first securement stand 31, the second securement stand 32, the swivel member 33 and the universal joint 34. The first securement stand 31 is attached to the first lens 1; the second securement stand 32 is attached to the second lens 2; the swivel member 33 is pivotally attached to the first securement stand 31; the universal joint 34 is constructed by a turning head portion 341 extended from the swivel member 33 and a receiving slot 342 provided on the second securement stand 32; the turning head portion 341 is pivotally attached to the receiving slot 342. Therefore, by using the foldable structure to allow the first lens 1 and the second lens 2 of the pair of eyeglasses 10 to be stacked over each other, the size of the eyeglasses 10 after folding can be effectively reduced such that the merits of being facilitated for storage with improved portability can be achieved.

FIGS. 4 to 7 are illustrations showing the states of uses of the pair of eyeglasses with a foldable structure 10 of the present invention. First, the universal joint 34 allows the second lens 2 to rotate vertically and relatively to the first lens 1 such that the first lens 1 and the second lens 2 are aligned with each other in a row and in a reverse direction. Furthermore, the second lens 2 rotates horizontally with the swivel member 33 to fold towards the first lens 2 such that the second lens 2 is stacked on top of the first lens 1. Finally, the first temple 5 and the second temple 6 of the foldable eyeglasses 10 allow the eyeglasses after folding to have a minimized folded size; therefore, the merits of the present invention as being facilitated for storage with improved portability can advantageously achieved.

Additionally, the first securement stand 31 comprises two protrusions 311 extended therefrom and spaced apart from each other in a top-down manner and a receiving slot 313 formed between the two protrusions 311. The swivel member 33 is a block 332 pivotally attached to the two protrusions 311 and received within the receiving slot 313. In order to prevent the swivel member 33 from being obviously exposed to the outer of the eyeglasses 10 and to avoid obstacles to the outer appearance of the eyeglasses, the swivel member 33 is, therefore, hidden inside the receiving slot 313 in order to improve the outer appearance and beauty of the eyeglasses 10.

Figure 1:
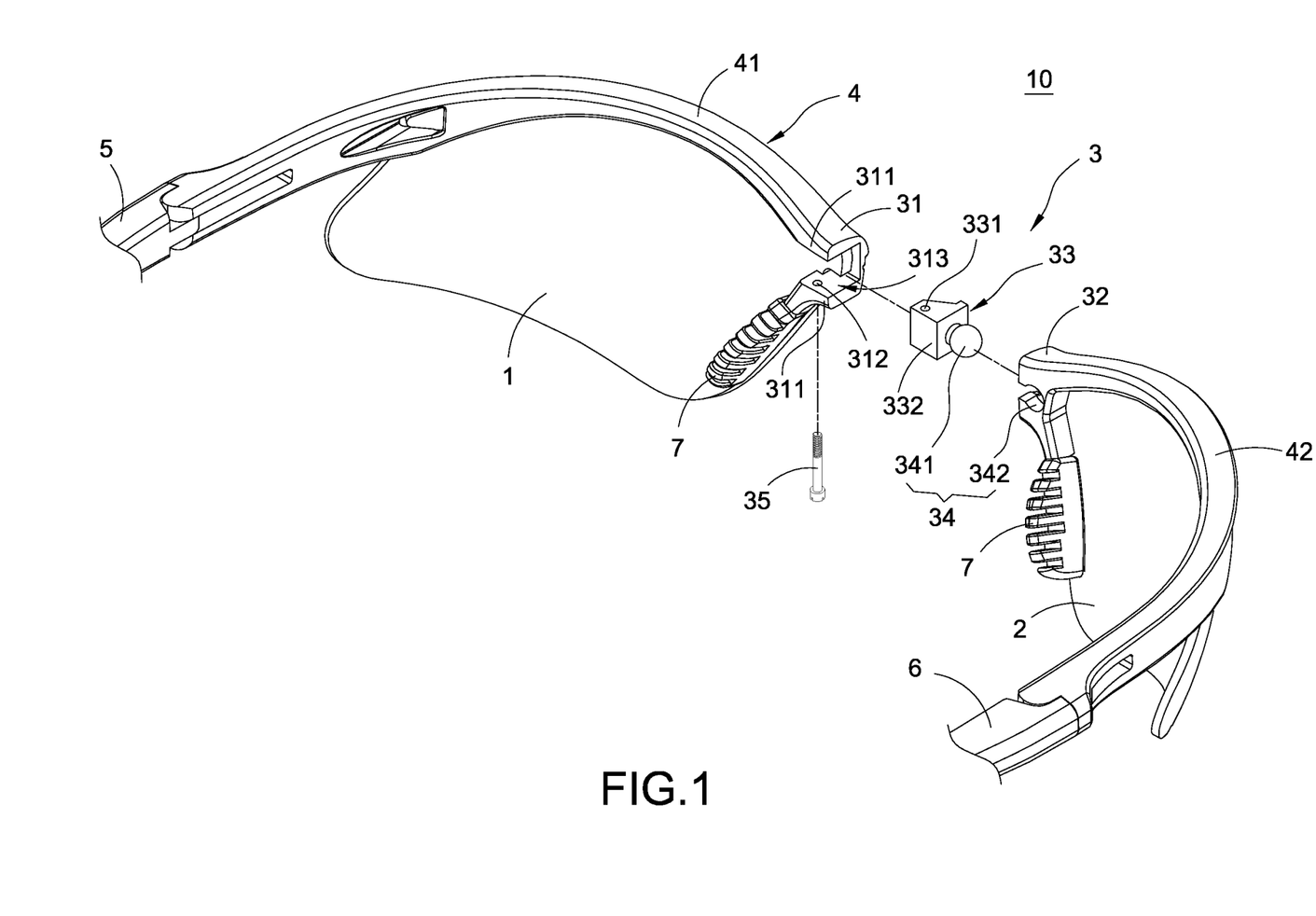
FIG. 1 is an exploded view of a preferred embodiment of a pair of eyeglasses of the present invention.
Figure 2:
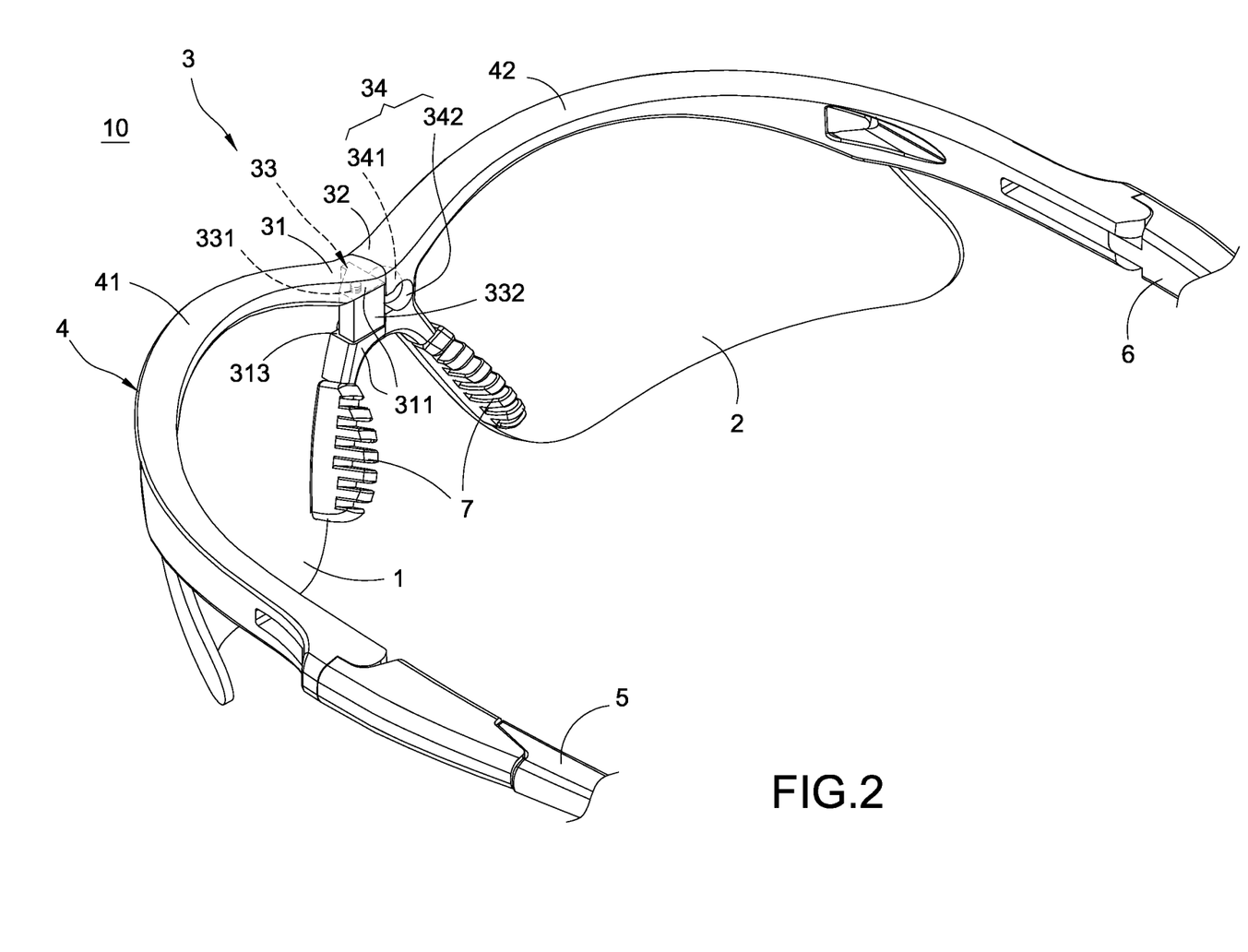
FIG. 2 is a perspective view of the preferred embodiment of the pair of eyeglasses of the present invention.
Figure 3:
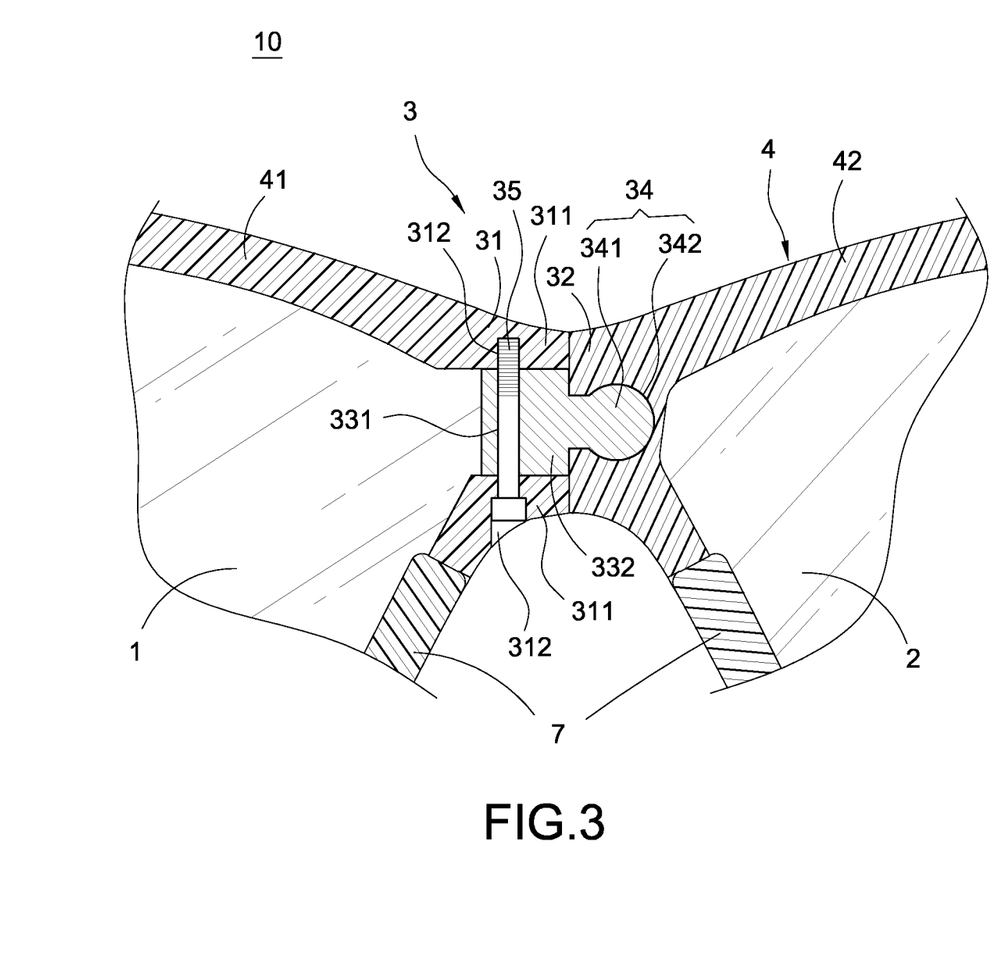
FIG. 3 is a cross sectional view of the preferred embodiment of the pair of eyeglasses of the present invention.
Figure 4:
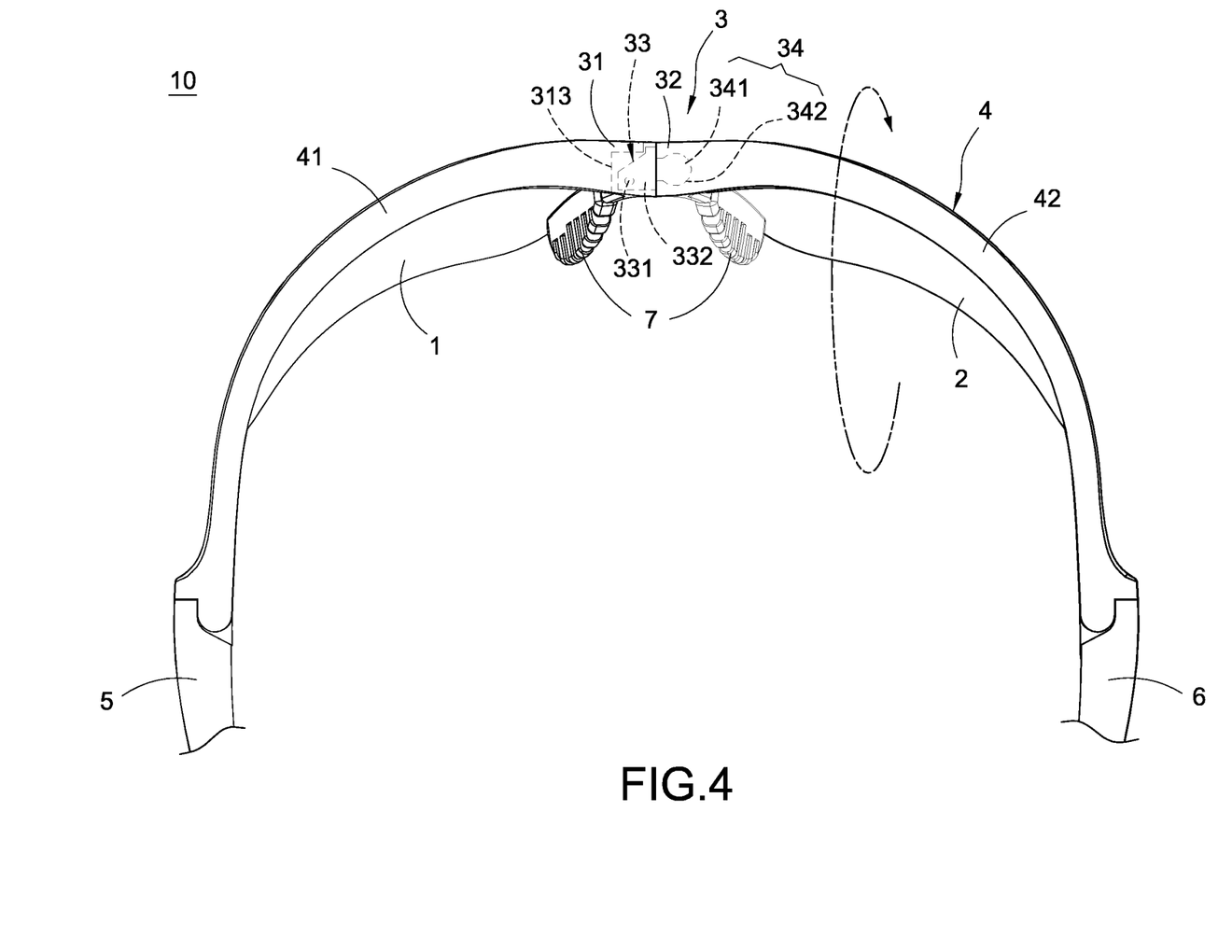
FIG. 4 is an illustration showing a state of use of the preferred embodiment of the pair of eyeglasses of the present invention.
Figure 5:
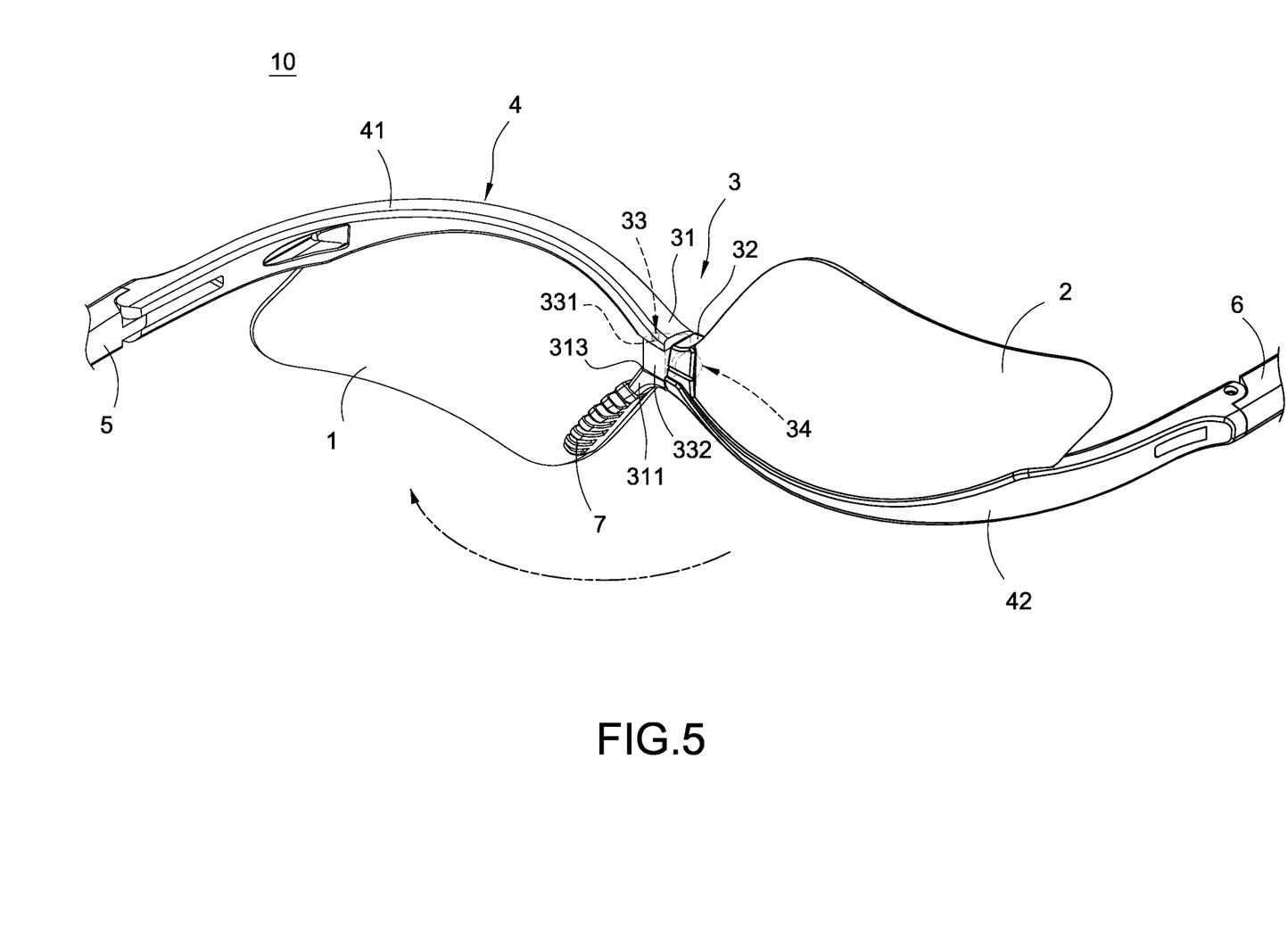
FIG. 5 is an illustration showing another state of use of the preferred embodiment of the pair of eyeglasses of the present invention.
Figure 6:
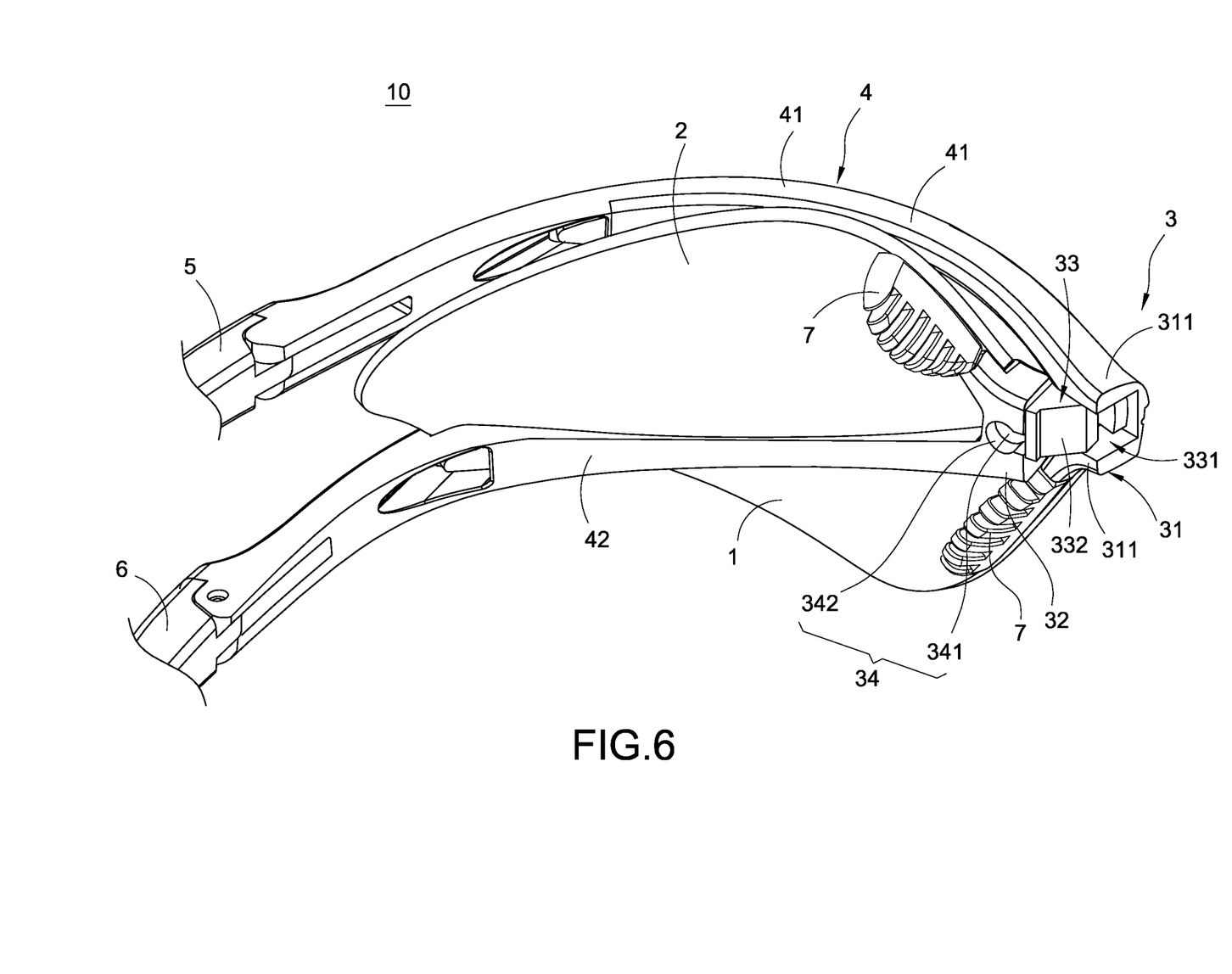
FIG. 6 is an illustration showing yet another state of use of the preferred embodiment of the pair of eyeglasses of the present invention.
Figure 7:
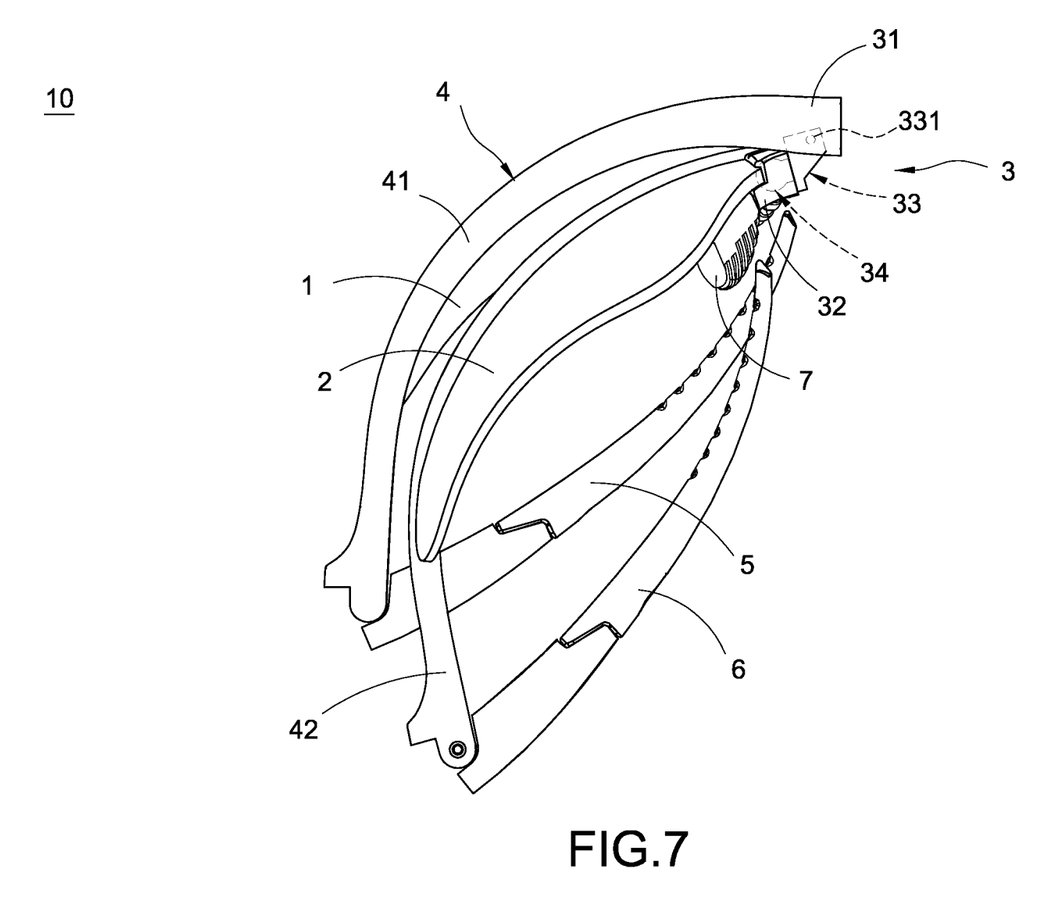
FIG. 7 is an illustration showing yet another state of use of the preferred embodiment of the pair of eyeglasses of the present invention.
Figure 8:
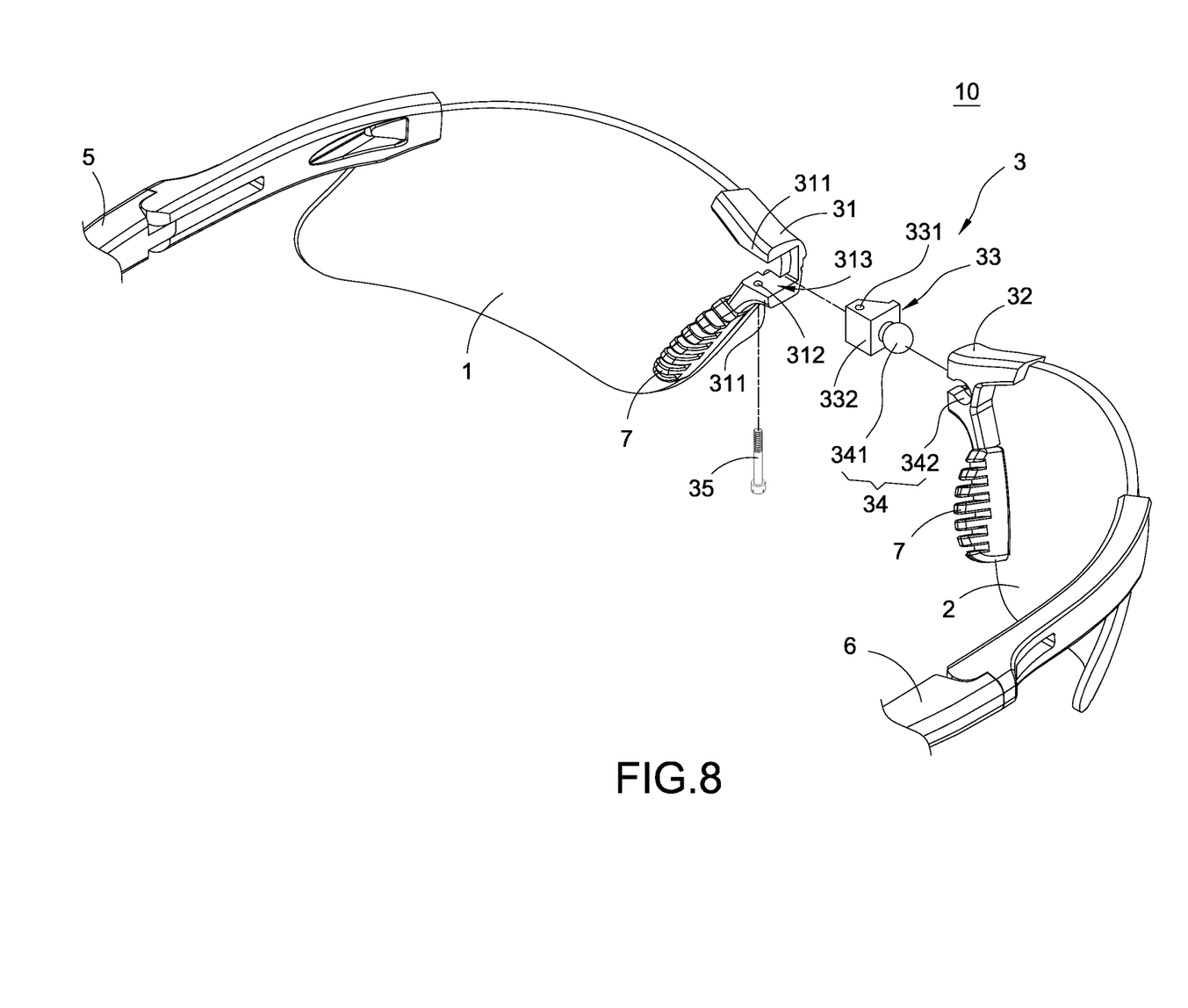
FIG. 8 is an exploded view of another preferred embodiment of a pair of eyeglasses of the present invention.

FIG. 8 shows another embodiment of the pair of eyeglasses of the present invention. As shown in the figure, in this embodiment, the pair of eyeglasses 10 is a type of a pair of frameless eyeglasses. The first securement stand 31 is directly secured onto the first lens 1, and the second securement stand 32 is directly secured onto the second lens 2. In addition, the first temple 5 is pivotally attached to the one end of the first lens 1 away from the first securement stand, and the second temple 6 is pivotally attached to one end of the second lens 2 away from the first securement stand 32. With such configuration, the pair of eyeglasses of this embodiment is able to achieve identical technical effects and merits previously mentioned.

Figure 9:
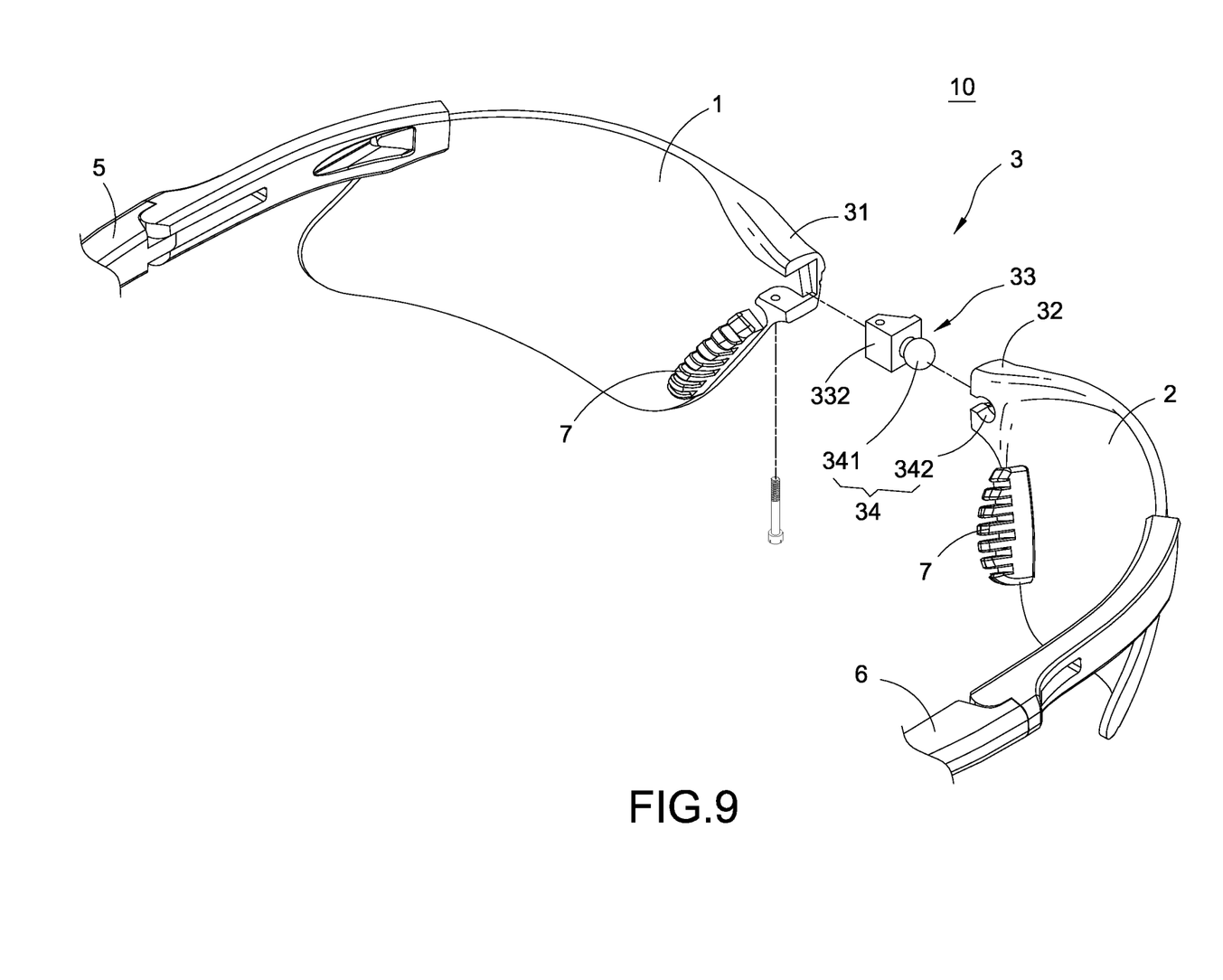
FIG. 9 is an exploded view of yet another preferred embodiment of a pair of eyeglasses of the present invention.

FIG. 9 shows yet another embodiment of the pair of eyeglasses of the present invention. As shown in the figure, in this embodiment, the pair of eyeglasses 10 is also a type of a pair of frameless eyeglasses. The first securement stand 31 is formed on an end portion of the first lens 1 adjacent to the second lens 2, and the second securement stand 32 is formed on an end portion of the second lens 2 adjacent to the first lens 1. With such configuration, the pair of eyeglasses of this embodiment is able to achieve identical technical effects and merits previously mentioned.

In view of the above, the pair of eyeglasses with a foldable structure of the present invention is unique and distinct from any types of eyeglasses in the same field, which clearly demonstrates the patentability of industrial applicability, novelty and inventive step. The present invention is in conformity with the requirements for the grant of the patent right and is an legitimate application to seek for the patent protection.

What is claimed is:

1. A foldable eyeglasses, comprising:
   a first lens;
   a second lens arranged correspondingly to the first lens; and
   a foldable structure installed between the first lens and the second lens, the foldable structure comprising a first securement stand, a second securement stand, a swivel member and a universal joint; wherein the first securement stand is attached to the first lens; the second securement stand is attached to the second lens; the swivel member is pivotally attached to the first securement stand; the universal joint is constructed by a turning head portion extended from the swivel member and a receiving slot provided on the second securement; and wherein the turning head portion is pivotally attached to the receiving slot,
   wherein the foldable structure further comprises an insertion pin; the first securement stand comprises two protrusions extended therefrom and spaced apart from each other in a top-down manner; inner sides of the two protrusions comprise two attachment holes facing opposite to each other; the swivel member comprises a through hole on one end away from the turning head portion; the insertion pin is inserted and secured into the two attachment holes and the through hole.

2. The foldable eyeglasses according to claim 1, wherein the turning head portion is a round ball.

3. The foldable eyeglasses according to claim 2, wherein the receiving slot is a ball shaped slot.

4. The foldable eyeglasses according to claim 1, further comprising a lens frame; wherein the lens frame further comprises a first lens section and a second lens section spaced apart from the first lens section; the first lens is secured onto the first lens frame section, and the second lens is secured onto the second lens frame section; the first securement stand is formed on an end portion of the first lens frame section adjacent to the second lens, and the second securement stand is formed on an end portion of the second lens frame section adjacent to the first lens.

5. The foldable eyeglasses according to claim 4, further comprising a first temple and a second temple; wherein the first temple is pivotally attached to one end of the first lens frame section away from the first securement stand, and the second temple is pivotally attached to one end of the second lens frame section away from the second securement stand.

6. The foldable eyeglasses according to claim 4, wherein the foldable structure further comprises an insertion pin; the first securement stand comprises two protrusions extended therefrom and spaced apart from each other in a top-down manner; inner sides of the two protrusions comprise two attachment holes facing opposite to each other; the swivel member comprises a through hole on one end away from the turning head portion; the insertion pin is inserted and secured into the two attachment holes and the through hole.

7. The foldable eyeglasses according to claim 4, wherein the first securement stand comprises two protrusions extended therefrom and spaced apart from each other in a top-down manner and a receiving slot formed between the two protrusions; the swivel member is a block pivotally attached to the two protrusions and received within the receiving slot.

8. The foldable eyeglasses according to claim 1, wherein the first securement stand is formed at an end portion of the first lens adjacent to the second lens, and the second securement stand is formed at an end portion of the second lens adjacent to the first lens.

9. The foldable eyeglasses according to claim 8, further comprising a first temple and a second temple; wherein the first temple is pivotally attached to one end of the first lens away from the first securement stand, and the second temple is pivotally attached to one end of the second lens away from the second securement stand.

10. A foldable eyeglasses, comprising:
a first lens;
a second lens arranged correspondingly to the first lens; and
a foldable structure installed between the first lens and the second lens, the foldable structure comprising a first securement stand, a second securement stand, a swivel member and a universal joint; wherein the first securement stand is attached to the first lens; the second securement stand is attached to the second lens; the swivel member is pivotally attached to the first securement stand; the universal joint is constructed by a turning head portion extended from the swivel member and a receiving slot provided on the second securement; and wherein the turning head portion is pivotally attached to the receiving slot, wherein the first securement stand comprises two protrusions extended therefrom and spaced apart from each other in a top-down manner and a receiving slot formed between the two protrusions; the swivel member is a block pivotally attached to the two protrusions and received within the receiving slot.

11. The foldable eyeglasses according to claim 1, further comprising a first temple and a second temple; wherein the first temple is pivotally attached to one end of the first lens away from the first securement stand, and the second temple is pivotally attached to one end of the second lens away from the second securement stand.

12. The foldable eyeglasses according to claim 1, further comprising two nose pads; wherein one of the nose pads is secured onto the first lens and arranged underneath the first securement stand, and another of the nose pads is secured onto the second lens and arrange underneath the second securement stand.

13. The foldable eyeglasses according to claim 10, wherein the turning head portion is a round ball.

14. The foldable eyeglasses according to claim 13, wherein the receiving slot is a ball shaped slot.

15. The foldable eyeglasses according to claim 10, further comprising a lens frame; wherein the lens frame further comprises a first lens section and a second lens section spaced apart from the first lens section; the first lens is secured onto the first lens frame section, and the second lens is secured onto the second lens frame section; the first securement stand is formed on an end portion of the first lens frame section adjacent to the second lens, and the second securement stand is formed on an end portion of the second lens frame section adjacent to the first lens.

16. The foldable eyeglasses according to claim 15, further comprising a first temple and a second temple; wherein the first temple is pivotally attached to one end of the first lens frame section away from the first securement stand, and the second temple is pivotally attached to one end of the second lens frame section away from the second securement stand.

17. The foldable eyeglasses according to claim 15, wherein the foldable structure further comprises an insertion pin; the first securement stand comprises two protrusions extended therefrom and spaced apart from each other in a top-down manner; inner sides of the two protrusions comprise two attachment holes facing opposite to each other; the swivel member comprises a through hole on one end away from the turning head portion; the insertion pin is inserted and secured into the two attachment holes and the through hole.

18. The foldable eyeglasses according to claim 15, wherein the first securement stand comprises two protrusions extended therefrom and spaced apart from each other in a top-down manner and a receiving slot formed between the two protrusions; the swivel member is a block pivotally attached to the two protrusions and received within the receiving slot.

19. The foldable eyeglasses according to claim 10, wherein the first securement stand is formed at an end portion of the first lens adjacent to the second lens, and the second securement stand is formed at an end portion of the second lens adjacent to the first lens.

20. The foldable eyeglasses according to claim 19, further comprising a first temple and a second temple; wherein the first temple is pivotally attached to one end of the first lens away from the first securement stand, and the second temple is pivotally attached to one end of the second lens away from the second securement stand.

* * * * *